United States Patent
Tripp

(10) Patent No.: US 9,201,769 B2
(45) Date of Patent: *Dec. 1, 2015

(54) PROGRESSIVE BLACK-BOX TESTING OF COMPUTER SOFTWARE APPLICATIONS

(71) Applicant: International Business Machines Corporation, Armonk, NY (US)

(72) Inventor: Omer Tripp, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/314,773

(22) Filed: Jun. 25, 2014

(65) Prior Publication Data
US 2015/0095888 A1   Apr. 2, 2015

Related U.S. Application Data

(63) Continuation of application No. 14/040,302, filed on Sep. 27, 2013.

(51) Int. Cl.
| | |
|---|---|
| *G06F 9/44* | (2006.01) |
| *G06F 11/36* | (2006.01) |
| *G06F 11/00* | (2006.01) |
| *G06F 21/57* | (2013.01) |

(52) U.S. Cl.
CPC .......... *G06F 11/3672* (2013.01); *G06F 21/577* (2013.01)

(58) Field of Classification Search
CPC .............. G06F 11/366; G06F 11/3446; G06F 11/3612; G06F 11/3636; G06F 11/3664; G06F 21/57; G06F 21/577; G06F 2221/033

USPC ............................................ 717/128; 726/25
See application file for complete search history.

(56) References Cited

U.S. PATENT DOCUMENTS

| | | |
|---|---|---|
| 6,249,882 B1 | 6/2001 | Testardi |
| 6,959,431 B1 | 10/2005 | Shiels et al. |
| 6,978,228 B1 | 12/2005 | Gordon |

(Continued)

FOREIGN PATENT DOCUMENTS

WO   2012166120 A1   12/2012

OTHER PUBLICATIONS

Galan et al., "A Multi-agent Scanner to Detect Stored-XSS Vulnerabilities," IEEE, 2010, 6pg.*

(Continued)

*Primary Examiner* — Ryan Coyer
(74) *Attorney, Agent, or Firm* — Patterson & Sheridan, LLP

(57) ABSTRACT

Testing computer software applications by performing a first black-box test on a computer software application, identifying any instructions of the computer software application that were reached by a payload of the first black-box test, determining a degree of success of the first black-box test in accordance with predefined success criteria, determining whether any of the instructions that were reached by the payload changed after performing the first black-box test, deciding whether to perform a second black-box test on the computer software application, where the deciding whether to perform the second black-box test is based on whether any of the instructions that were reached by the payload of the first black-box test changed after performing the first black-box test, and the degree of success of the first black-box test.

10 Claims, 3 Drawing Sheets

(56) References Cited

U.S. PATENT DOCUMENTS

| | | | |
|---|---|---|---|
| 7,028,223 | B1 | 4/2006 | Kolawa et al. |
| 7,596,778 | B2 | 9/2009 | Kolawa et al. |
| 7,603,660 | B2 * | 10/2009 | Davia et al. ............... 717/128 |
| 7,665,072 | B2 | 2/2010 | Tillman et al. |
| 7,685,575 | B1 | 3/2010 | Fareed |
| 7,900,193 | B1 | 3/2011 | Kolawa et al. |
| 7,987,390 | B2 | 7/2011 | Chandrasekaran |
| 8,024,807 | B2 * | 9/2011 | Hall et al. ............... 726/25 |
| 8,122,438 | B2 | 2/2012 | Cain, III et al. |
| 8,122,439 | B2 | 2/2012 | Cascaval et al. |
| 8,136,095 | B2 | 3/2012 | Natanov et al. |
| 8,141,158 | B2 | 3/2012 | Calendino et al. |
| 8,276,123 | B1 * | 9/2012 | Deng et al. ............... 717/125 |
| 8,296,735 | B2 | 10/2012 | Fehnker et al. |
| 8,370,798 | B2 | 2/2013 | Broadfoot et al. |
| 8,397,300 | B2 * | 3/2013 | Tripp ............... 726/25 |
| 8,484,732 | B1 * | 7/2013 | Chen et al. ............... 726/22 |
| 8,528,095 | B2 * | 9/2013 | Haviv et al. ............... 726/25 |
| 8,539,585 | B2 * | 9/2013 | Chen et al. ............... 726/25 |
| 2003/0046029 | A1 | 3/2003 | Wiener et al. |
| 2003/0140337 | A1 | 7/2003 | Aubury |
| 2004/0230956 | A1 | 11/2004 | Cirne et al. |
| 2005/0283768 | A1 | 12/2005 | Ozone |
| 2007/0061625 | A1 | 3/2007 | Acosta et al. |
| 2008/0184208 | A1 | 7/2008 | Sreedhar et al. |
| 2008/0244321 | A1 | 10/2008 | Kelso |
| 2009/0282480 | A1 | 11/2009 | Lee et al. |
| 2010/0088683 | A1 | 4/2010 | Golender et al. |
| 2010/0229158 | A1 | 9/2010 | Ike |
| 2011/0191855 | A1 * | 8/2011 | De Keukelaere et al. ...... 726/25 |
| 2012/0011493 | A1 * | 1/2012 | Singh et al. ............... 717/168 |
| 2012/0110549 | A1 | 5/2012 | Gutz et al. |
| 2012/0110551 | A1 | 5/2012 | Fink et al. |
| 2012/0266248 | A1 | 10/2012 | Amit et al. |
| 2013/0024846 | A1 | 1/2013 | Lewis et al. |

OTHER PUBLICATIONS

Gebre et al., "A Robust Defense Against Content-Sniffing XSS Attacks," IEEE, 2010, 6pg.*

U.S. Appl. No. 14/040,302 entitled "Progressive Black-Box Testing of Computer Software Applications" filed Sep. 27, 2013.

T. Y. Chen et al., "White on Black: A White-Box-Oriented Approach for Selecting Black-Box-Generated Test Cases", Proceedings of the First Asia-Pacific Conference on Quality Software, Oct. 30-31, 2000, Hong Kong, China, pp. 275-284.

E. Steegmans et al., "Black & White Testing: Bridging Black Box Testing and White Box Testing and White Box Testing", Conferentie Software Testing: Beheers Optimaal de Risico's van IT in uw Business, location:Leuven, Belgium, date: Jan. 20-21, 2004, pp. 1-12, <<https://lirias.kuleuven.be/bitstream/123456789/134277/1/Paper.pdf>>.

Stephen H. Edwards, "Black-Box Testing Using Flow Graphs: An Experimental Assessment of Effectiveness and Automation Potential", Software Testing, Verification and Reliability, vol. 10, No. 4, pp. 249-262, Dec. 2000, <<http://people.cs.vt.edu/~edwards/downloads/edwards-stvr-0012.pdf>>.

Nicolas Kicillof et al., "Achieving Both Model and Code Coverage W Ith Automated Gray-Box Sting", Proceedings of the 3rd International Workshop on Advances in Model-Based Testing, London, United Kingdom, Jul. 9-12, 2007, pp. 1-11, Publisher: Association for Computing Machinery, New York, NY, USA.

Jörg Herrmann et al., "Variants of Validity and Their Impact on the Overall Test Space", Proceedings of the Eleventh International Florida Artificial Intelligence Research Society Conference, pp. 472-477, Year of Publication: 1998, Publisher: AAAI Press, <<http://www.aaai.org/Papers/FLAIRS/1998/FLAIRS98-091.pdf>>.

Michal Chmielewski et al., "Find and Fix Vulnerabilities Before Your Application Ships", MSDN Magazine, Nov. 2007 Issue, Publisher: Microsoft Corporation, <<http://msdn.microsoft.com/en-us/magazine/cc163312.aspx>>.

James Skene, "CS 230 Software Design and Construction—Part 3: Introduction to software engineering—Topic 6:.Verification", Department of Computer Science, University of Auckland, New Zealand, May 2009, <<http://www.cs.auckland.ac.nz/compsci230s1c/lectures/james/cs230-2009-6.pdf>>.

Dewhurst Ryan, "Implementing basic static code analysis into integrated development environments (ides) to reduce software vulnerablitilies", A Report submitted in partial fulfillment of the regulations governing the award of the Degree of BSc (Honours) Ethical Hacking for Computer Security at the University of Northumbria at Newcastle, 2011-2012.

* cited by examiner

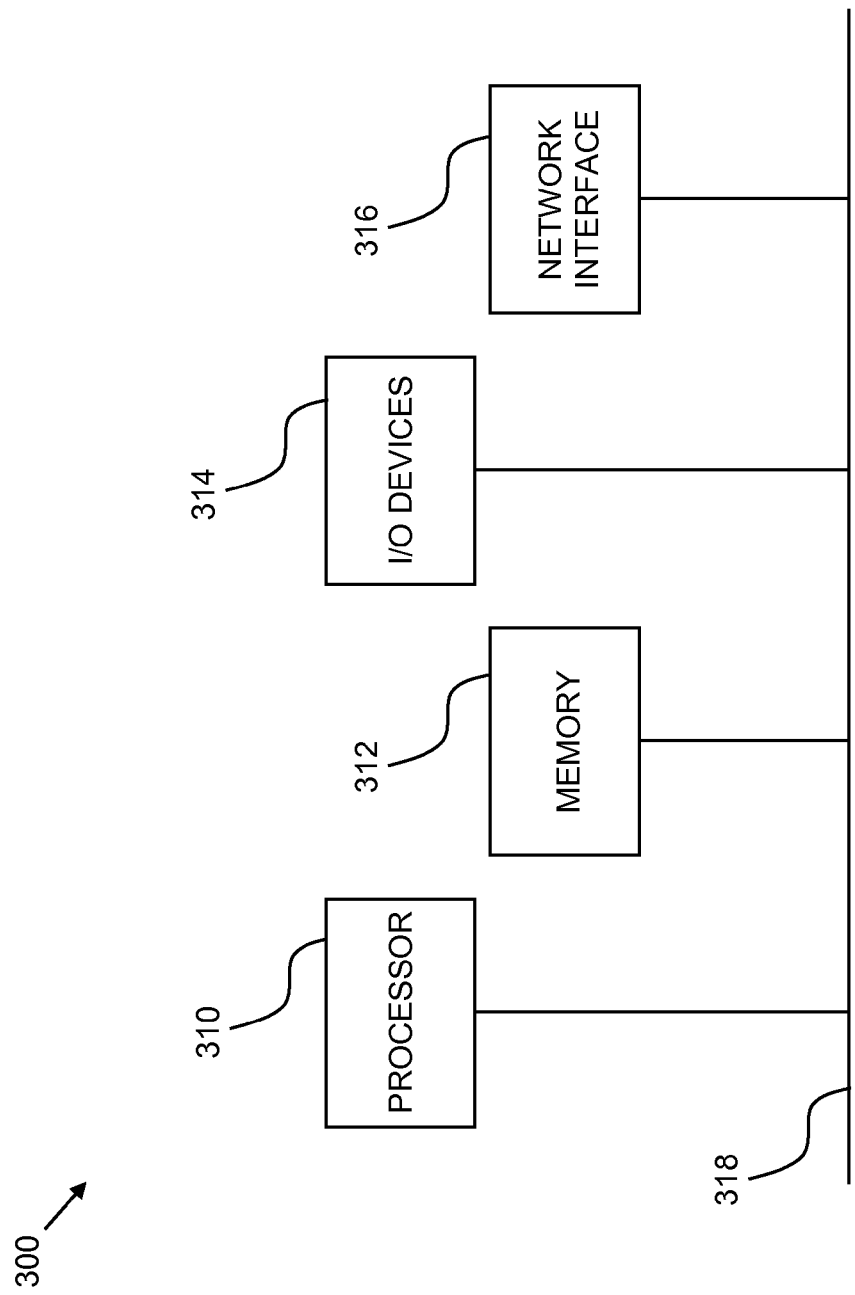

PROGRESSIVE BLACK-BOX TESTING OF COMPUTER SOFTWARE APPLICATIONS

CROSS-REFERENCE TO RELATED APPLICATION

This application is a continuation of co-pending U.S. patent application Ser. No. 14/040,302, filed Sep. 27, 2013. The aforementioned related patent application is herein incorporated by reference in its entirety.

FIELD OF THE INVENTION

The invention relates to computer software testing in general.

BACKGROUND OF THE INVENTION

Dynamic analysis tools are often used by computer software developers to test computer software applications, typically by first exploring a computer software application to discover its interfaces, including those by which data may be provided to the application, and then by interacting with the application's interfaces and monitoring the application's responses to such interactions. In one type of dynamic analysis a computer software application is tested for security vulnerabilities by providing test data designed to exploit a security vulnerability as input to the application, and then observing the behavior of the application. For example, dynamic analysis may be used to test a web application by employing a "black-box tester" that sends HTTP requests as input to the web application. The HTTP requests are configured with test payloads drawn from a library of test payloads designed to test for security vulnerabilities such as SQL injection, cross-site scripting (XSS), and command injection.

Such testing is typically performed at different points during the development and modification of a computer software application. For example, during one testing cycle a black-box tester may discover that a certain HTTP parameter is vulnerable to XSS attacks by sending a certain sequence of test payloads. The black-box tester reports the vulnerability to the software developer, who then modifies the underlying instructions of the computer software application to address the vulnerability. During a subsequent testing cycle the black-box tester is likely to test the computer software application using the same test payloads. However, if the modification does not fully address the vulnerability, but suffices to protect against the particular test payloads previously used by the black-box tester, then the black-box tester will not discover that the vulnerability still exists. Furthermore, testing areas of the application that were not modified will necessarily duplicate the results of the previous testing cycle.

SUMMARY OF THE INVENTION

In one aspect of the invention a method is provided for testing computer software applications, the method including performing a first black-box test on a computer software application, identifying any instructions of the computer software application that were reached by a payload of the first black-box test, determining a degree of success of the first black-box test in accordance with predefined success criteria, determining whether any of the instructions that were reached by the payload changed after performing the first black-box test, deciding whether to perform a second black-box test on the computer software application, where the deciding whether to perform the second black-box test is based on whether any of the instructions that were reached by the payload of the first black-box test changed after performing the first black-box test, and the degree of success of the first black-box test.

In other aspects of the invention systems and computer program products embodying the invention are provided.

BRIEF DESCRIPTION OF THE DRAWINGS

The invention will be understood and appreciated more fully from the following detailed description taken in conjunction with the appended drawings in which:

FIG. 3 is a simplified block diagram illustration of an exemplary hardware implementation of a computing system, constructed and operative in accordance with an embodiment of the invention.

DETAILED DESCRIPTION OF THE INVENTION

Figure 1:
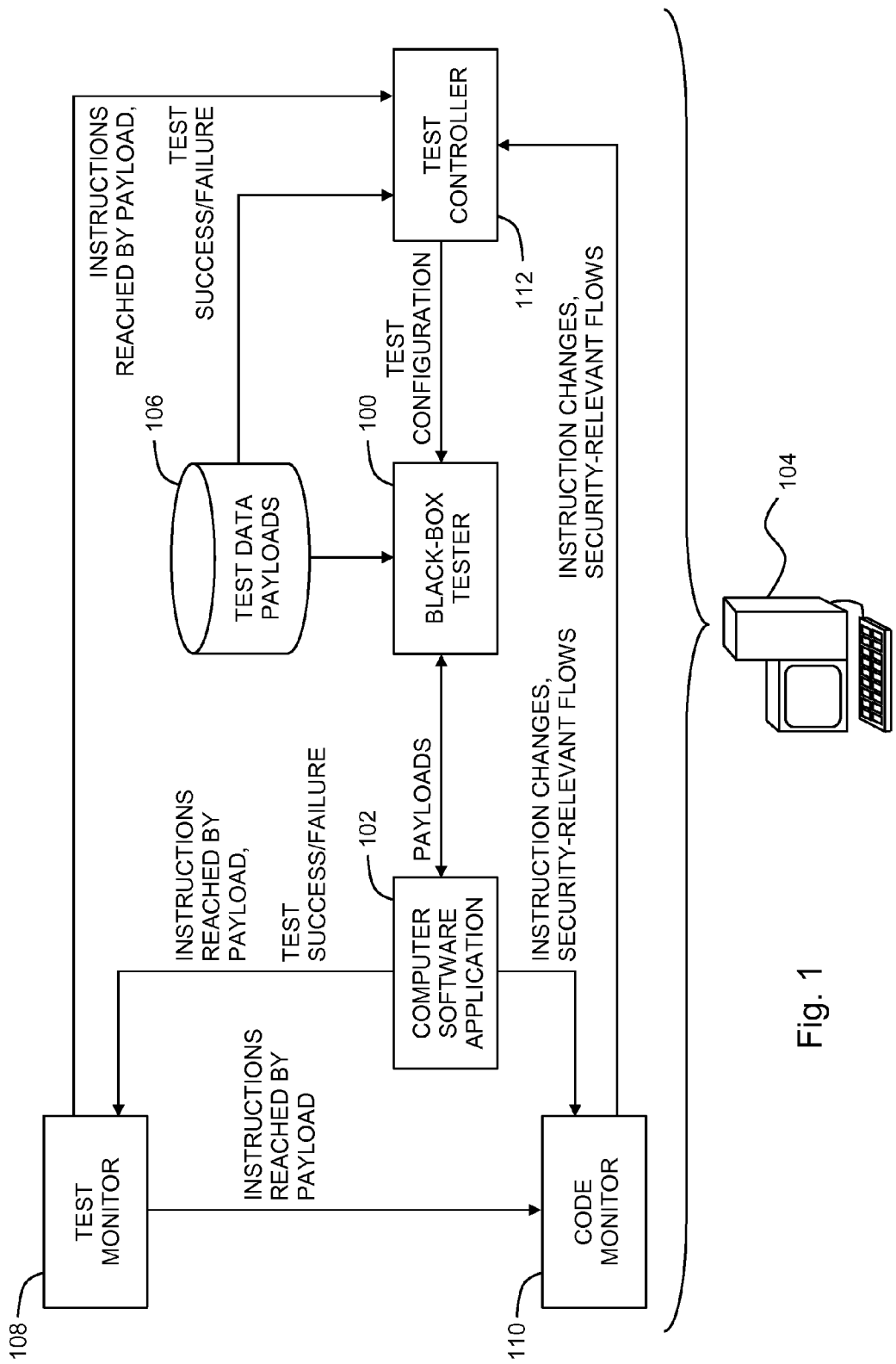
FIG. 1 is a simplified conceptual illustration of a system for progressive black-box testing of computer software applications, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a simplified conceptual illustration of a system for is a simplified conceptual illustration of a system for progressive black-box testing of computer software applications, constructed and operative in accordance with an embodiment of the invention. In the system of FIG. 1, a black-box tester 100, such as IBM Security AppScan™, commercially-available from International Business Machines Corporation, Armonk, N.Y., is configured to test a computer software application 102 during its execution by a computer, such as a computer 104, by interacting with computer software application 102 in accordance with conventional black-box testing techniques except as is otherwise described herein. Computer software application 102 may be any type of computer software application that is suitable for testing using conventional black-box testing techniques, including computer software applications configured for use with mainframe and desktop computers and mobile computing devices, as well as "web" applications including Hypertext Markup Language (HTML)-encoded web pages that may be hosted by a computer server and accessed by one or more client computers via a computer network, such as the Internet. Black-box tester 100 preferably interacts with computer software application 102 by providing inputs to computer software application 102 that include various payloads of test data that are configured to test for one or more known security vulnerabilities, such as SQL injection, cross-site scripting, and command injection, where each payload is designed to exploit a given security vulnerability. The payloads are preferably selected from a library of predefined payloads 106.

A test monitor 108 is preferably configured to identify, using conventional techniques, any instructions within computer software application 102 that were reached by a payload provided as input to computer software application 102 by black-box tester 100. Test monitor 108 is also preferably configured to determine, using conventional techniques, a degree of success of any of the tests performed by black-box tester 100 on computer software application 102, where success is determined in accordance with any known, predefined success criteria.

A code monitor 110 is preferably configured to determine, using conventional techniques, whether any of the instructions of computer software application 102 that were reached by any payload changed after black-box tester 100 provided the payload to computer software application 102, where such changes include modification or deletion of existing instructions and/or addition of new instructions. Code monitor 110 may, for example, monitor coding tools, such as integrated development environment (IDE) tools, that a software developer uses to modify the instructions of computer software application 102. Code monitor 110 preferably monitors the instructions of computer software application 102 for such changes between testing cycles performed by black-box tester 100 with regard to computer software application 102. Code monitor 110 is also preferably configured to determine, using conventional techniques, whether the instructions of computer software application 102 that were reached by a payload participate in a security-relevant flow, such as by performing a static taint analysis to find data flows from "source" statements that read untrusted user input to "sink" statements that performing security-sensitive operations such as writing to a database.

A test controller 112 is preferably configured to decide whether to perform a black-box test of computer software application 102 using a given payload, where the decision is based on 1) whether any of the instructions that were reached by the payload during a previous black-box test changed after the previous black-box test was performed, and 2) the degree of success of the previous black-box test. Thus, for example:

if the previous black-box test using the given payload failed, and the instructions that were reached by the payload changed after the previous black-box test was performed, then test controller 112 preferably decides to perform the same black-box test again using the same payload, as a change to the instructions do not guarantee that the same black-box test will produce the same result as before;

if the previous black-box test using the given payload failed, and the instructions that were reached by the payload are unchanged after the previous black-box test was performed, then test controller 112 preferably decides to perform a subsequent black-box test again using a variant of the payload, as it may be assumed that performing a subsequent black-box test using the same payload a will produce the same result as before;

if the previous black-box test using the given payload succeeded, and the instructions that were reached by the payload changed after the previous black-box test was performed, then test controller 112 preferably decides to perform a subsequent black-box test to test for the same type of behavior, but using a variant of the payload, in case the changed instructions suffice to protect against the given payload, but does not fully address the vulnerability associated with the given payload;

if the previous black-box test using the given payload succeeded, and the instructions that were reached by the payload are unchanged after the previous black-box test was performed, then test controller 112 preferably decides to perform a subsequent black-box test to test for the same type of behavior, but using a variant of the payload, and/or a subsequent black-box test to test for a different type of behavior not previously tested, as it may be assumed that performing a subsequent black-box test using the same payload a will produce the same result as before.

Test controller 112 is also preferably configured to decide whether to perform a subsequent black-box test based on whether a detected change to any of the instructions that were reached by the payload relates to a security vulnerability, such as where the change eliminates a security vulnerability previously determined to be associated with the instructions or introduces a new security vulnerability.

Test controller 112 also preferably configures the subsequent black-box test in accordance with the decision to perform a subsequent black-box test, such as by selecting the test and the payload or payload variant as applicable. Test controller 112 also preferably configures the subsequent black-box test based on a characteristic of the instructions that were reached by the payload of the previous black-box test. Thus, for example, if the instructions include characteristics that indicate potential vulnerability to SQL injection, but not to cross-site scripting, then test controller 112 preferably configures the subsequent black-box test by selecting a test and a payload that tests for vulnerability to SQL injection, but not to cross-site scripting. Where the instructions that were reached by the payload relates to a security vulnerability, test controller 112 is preferably configured to perform static string analysis on the instructions of computer software application 102 that participate in a security-relevant flow to identify predefined illegal input patterns that reach sinks statements along the security-relevant flow. Test controller 112 then preferably configures one or more subsequent black-box tests with payloads that are compatible with these patterns.

Test controller 112 is preferably configured to notify black-box tester 100 of its decision to perform a subsequent black-box test on computer software application 102, which notification preferably includes any configuration information related to the subsequent black-box test described hereinabove, whereupon black-box tester 100 performs the subsequent black-box. The system of FIG. 1 may be employed over multiple cycles of black-box testing of computer software application 102 followed by modification of the underlying instructions of computer software application 102.

Any of the elements shown in FIG. 1 are preferably implemented by a computer, such by computer 104, by implementing any of the elements in computer hardware and/or in computer software embodied in a non-transitory, computer-readable storage medium in accordance with conventional techniques.

Figure 2:
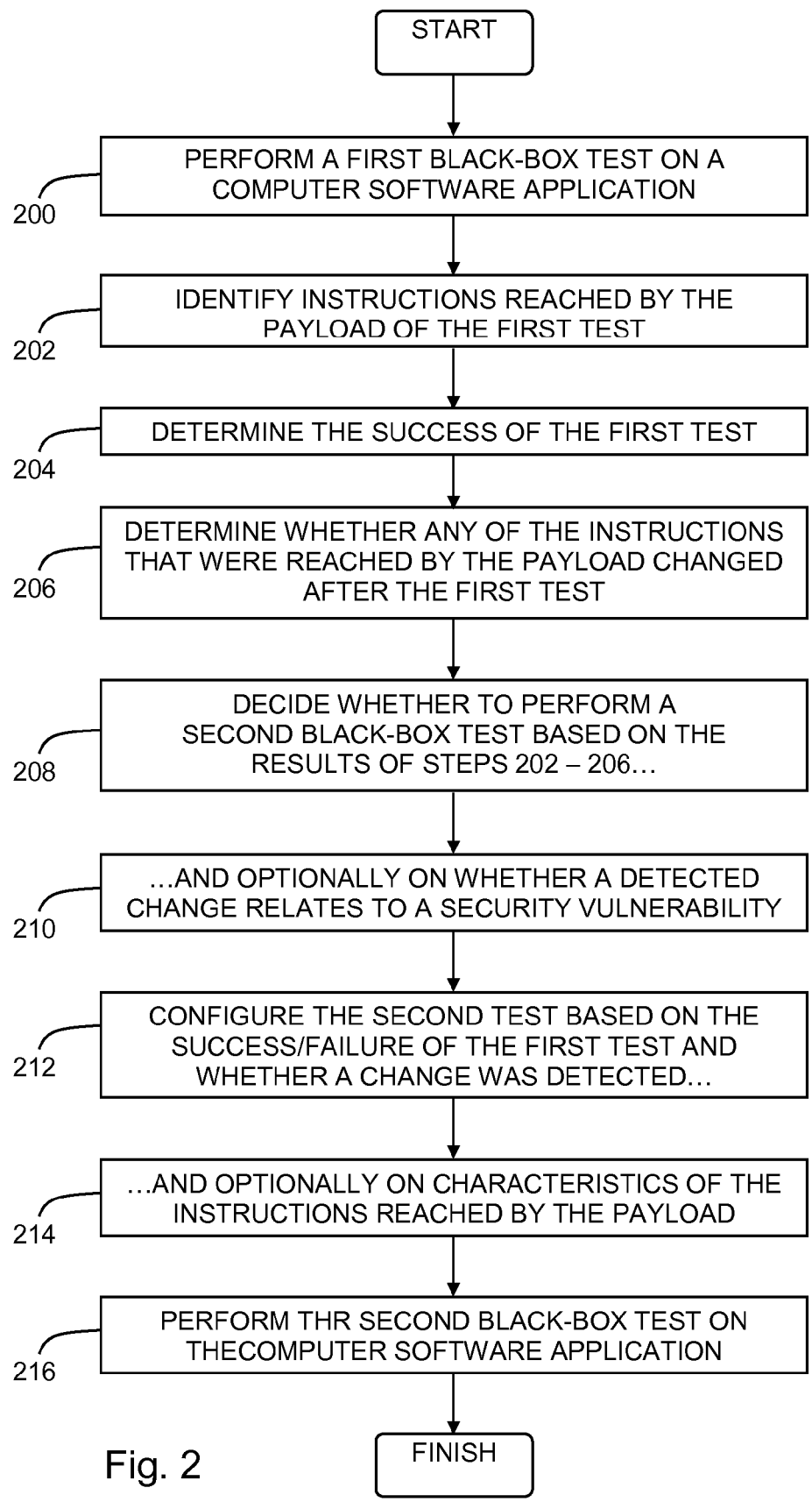
FIG. 2 is a simplified flowchart illustration of an exemplary method of operation of the system of FIG. 1, operative in accordance with an embodiment of the invention.

Reference is now made to FIG. 2, which is a simplified flowchart illustration of an exemplary method of operation of the system of FIG. 1, operative in accordance with an embodiment of the invention. In the method of FIG. 2 a first black-box test is performed on a computer software application (step 200). Any instructions of the computer software application that were reached by the payload of the first black-box test are identified (step 202). A degree of success of the first black-box test is determined in accordance with predefined success criteria (step 204). A determination is made whether any of the instructions that were reached by the payload changed after performing the first black-box test (step 206). A decision is made whether to perform a second black-box test on the computer software application, where the decision is based on whether any of the instructions that were reached by the payload of the first black-box test changed after performing the first black-box test, and the degree of success of the first black-box test (step 208), and optionally on whether a detected change to any of the instructions that were reached by the payload relates to a security vulnerability (step 210). The second black-box test is configured to be identical to the first black-box test, a variant thereof, and/or a different test altogether (step 212) based on the success/failure of the first black-box test and whether any of the instructions that were reached by the payload changed after performing the first black-box test, and optionally based on a characteristic of the instructions that were reached by the payload of the first black-box test (step 214). The second black-box test is performed on the computer software application (step 216).

Referring now to FIG. 3, block diagram 300 illustrates an exemplary hardware implementation of a computing system in accordance with which one or more components/methodologies of the invention (e.g., components/methodologies described in the context of FIGS. 1-2) may be implemented, according to an embodiment of the invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for testing computer software applications, the method comprising:
   performing, via a black-box tester, a first black-box test on a computer software application;
   identifying any instructions of the computer software application that were reached by based on a payload of the first black-box test;
   determining a degree of success of the first black-box test in accordance with predefined success criteria;
   monitoring coding tools used to modify the instructions of the computer software application;
   monitoring the instructions of the computer software application for changes after black-box tests are performed on the computer software application;
   determining, based on the monitored coding tools and the monitored instructions, whether any of the instructions that were reached by the payload changed after performing the first black-box test; and
   deciding whether to perform a second black-box test on the computer software application, wherein the deciding whether to perform the second black-box test is based on: whether any of the instructions that were reached by the payload of the first black-box test changed after performing the first black-box test and the degree of success of the first black-box test, and wherein the performing, identifying, determining, and deciding steps are implemented in any of:
   a) computer hardware configured to perform said steps, and
   b) computer software configured to perform said steps and embodied in a non-transitory, computer-readable storage medium.

2. The method according to claim 1 wherein the deciding whether to perform the second black-box test is further based on whether a detected change to any of the instructions that were reached by the payload relates to a security vulnerability.

3. The method according to claim 1 and further comprising configuring the second black-box test to be identical to the first black-box test.

4. The method according to claim 3 and further comprising performing the second black-box test responsive to determining that the first black-box test failed and that any of the instructions that were reached by the payload of the first black-box test changed after performing the first black-box test.

5. The method according to claim 1 and further comprising configuring the second black-box test to include a variant of the payload used in the first black-box test, wherein both the first black-box test and the second black-box test are configured to test for the same type of behavior.

6. The method according to claim 5 and further comprising performing the second black-box test responsive to determining that the first black-box test failed and that the instructions that were reached by the payload of the first black-box test are unchanged after performing the first black-box test.

7. The method according to claim 5 and further comprising performing the second black-box test responsive to determining that the first black-box test succeeded and that the instructions that were reached by the payload of the first black-box test are unchanged after performing the first black-box test.

8. The method according to claim 5 and further comprising performing the second black-box test responsive to determining that the first black-box test succeeded and that any of the instructions that were reached by the payload of the first black-box test changed after performing the first black-box test.

9. The method according to claim 1 and further comprising:
   determining whether the instructions that were reached by the payload of the first black-box test participate in a security-relevant flow; and
   performing the second black-box test only if the instructions that were reached by the payload of the first black-box test participate in a security-relevant flow.

10. The method according to claim 1 and further comprising configuring the second black-box test based on a characteristic of the instructions that were reached by the payload of the first black-box test.

* * * * *